(12) United States Patent
Morinaga et al.

(10) Patent No.: US 12,423,212 B2
(45) Date of Patent: Sep. 23, 2025

(54) ANALYSIS APPARATUS MANAGEMENT SYSTEM, MANAGEMENT METHOD, MANAGEMENT PROGRAM, AND MANAGEMENT APPARATUS

(71) Applicant: HORIBA, Ltd., Kyoto (JP)

(72) Inventors: Kayo Morinaga, Kyoto (JP); Atsushi Bando, Kyoto (JP); Yuri Yamazaki, Kyoto (JP); Yuri Okura, Kyoto (JP)

(73) Assignee: HORIBA, LTD., Kyoto (JP)

( * ) Notice: Subject to any disclaimer, the term of this patent is extended or adjusted under 35 U.S.C. 154(b) by 438 days.

(21) Appl. No.: 17/785,575

(22) PCT Filed: Oct. 20, 2020

(86) PCT No.: PCT/JP2020/039384
§ 371 (c)(1),
(2) Date: Jun. 15, 2022

(87) PCT Pub. No.: WO2021/124670
PCT Pub. Date: Jun. 24, 2021

(65) Prior Publication Data
US 2023/0024155 A1    Jan. 26, 2023

(30) Foreign Application Priority Data
Dec. 20, 2019   (JP) .................. 2019-230527

(51) Int. Cl.
*G06F 11/34*   (2006.01)
(52) U.S. Cl.
CPC .................. *G06F 11/3495* (2013.01)
(58) Field of Classification Search
CPC .................. G06F 1/12; G06F 9/44
See application file for complete search history.

(56) References Cited

U.S. PATENT DOCUMENTS

2013/0223695 A1* 8/2013 Park ................ H04N 7/147
382/118
2014/0300512 A1* 10/2014 Steinhardt ............... G06F 17/18
342/357.32

(Continued)

FOREIGN PATENT DOCUMENTS

CN       106185468 A    12/2016
CN       108780528 A    11/2018

(Continued)

OTHER PUBLICATIONS

Extended European Search Report dated Oct. 31, 2023 for the corresponding European Application No. 20901091.7.

(Continued)

*Primary Examiner* — Keshab R Pandey
(74) *Attorney, Agent, or Firm* — LUCAS & MERCANTI, LLP (57) ABSTRACT

The present invention is capable of centrally managing the operation type of a plurality of analysis apparatus and includes: one or more analysis apparatuses; and a management apparatus that acquires various data from each of the one or more analysis apparatuses and centrally manages the acquired data, wherein each of the one or more analysis apparatuses includes an operation type data acquisition part that acquires data of each preset operation type, and an operation type data transmission part that transmits the operation type data acquired by the operation type data acquisition part, and the management apparatus includes an operation type data reception part that receives the operation type data, and a display control part that displays a list of the operation type data received by the operation type data reception part for each of the one or more analysis apparatuses.

13 Claims, 9 Drawing Sheets

(56) References Cited

U.S. PATENT DOCUMENTS

2016/0127686 A1* 5/2016 Nagase ............... H04L 65/403
                                                                       348/14.07
2018/0225578 A1   8/2018 Vyas et al.
2019/0087386 A1   3/2019 Ono

FOREIGN PATENT DOCUMENTS

| | | |
|---|---|---|
| EP | 3410442 A1 | 12/2018 |
| EP | 3473999 A1 | 4/2019 |
| JP | 2004-271327 A | 9/2004 |
| JP | 2005-265743 A | 9/2005 |
| JP | 2007-148876 A | 6/2007 |
| JP | 2008-234070 A | 10/2008 |
| JP | 4303492 B2 | 7/2009 |
| JP | 2013-245967 A | 12/2013 |
| JP | 2017-090982 A | 5/2017 |
| JP | 2018-109879 A | 7/2018 |
| JP | 2018-179895 A | 11/2018 |
| WO | 2017098650 A1 | 6/2017 |

OTHER PUBLICATIONS

International Search Report for the corresponding application No. PCT/JP2020/039384 dated Jan. 26, 2021, with English translation.
Office Action issued for the related Chinese patent application No. 202080087390.4, dated Apr. 14, 2025, with English translation, 15 pages.

* cited by examiner

AUTHORITY DATA (Role Table)

| Function | | Administrator | Operator |
|---|---|---|---|
| File | New Project | O | O |
| | Open Project | O | O |
| | Close Project | O | O |
| | Delete Project | O | X |
| Measurement | | | |

ACCOUNT DATA (Account Info.)

| User ID | password | role |
|---|---|---|
| User 1 | **** | ANALYSIS APPARATUS 1-LabA-Administrator, ANALYSIS APPARATUS 2-LabB-Administrator |
| User 2 | **** | ANALYSIS APPARATUS 1-LabA-Operator |
| User 3 | **** | ANALYSIS APPARATUS 1-LabB-Operator |

FOR EXAMPLE, BY SETTING User 1 TO Admin_group, OPERATION TYPES SET FOR ADMINISTRATOR CAN BE SET AT ONCE.

User 1 ——— Admin_group ——— System – Administrator, System – Approver, System – Auditor, ···

FURTHER, BY SETTING User 2 TO Operator_group, OPERATION TYPES SET FOR OPERATOR CAN BE SET AT ONCE.

User 2 ——— Operator_group ——— XGT9000_AK – Operator, XGT9000_di – Operator, ···

ANALYSIS APPARATUS MANAGEMENT SYSTEM, MANAGEMENT METHOD, MANAGEMENT PROGRAM, AND MANAGEMENT APPARATUS

CROSS REFERENCE TO RELATED APPLICATION

This Application is a 371 of PCT/JP2020/039384 filed on Oct. 20, 2020, which, in turn, claimed the priority of Japanese Patent Application No. 2019-230527 filed on Dec. 20, 2019, and both applications are incorporated herein by reference.

TECHNICAL FIELD

The present invention relates to an analysis apparatus management system, a management method, a management program, and a management apparatus.

BACKGROUND ART

Conventionally, an analysis apparatus management system is considered that manages a plurality of analysis apparatuses and centrally manages the analysis data of the plurality of analysis apparatuses as disclosed in Patent Literature 1. The analysis apparatus management system is also configured to accumulate the operation time of each of the plurality of analysis apparatuses.

CITATION LIST

Patent Literature

Patent Literature 1: JP 2013-245967 A

SUMMARY OF INVENTION

Technical Problem

In recent years, when a plurality of analysis apparatuses are to be managed, it is desired to not only simply manage the analysis data and accumulated operation time, but also collect data on the operational status of the plurality of analysis apparatuses in order to manage the plurality of analysis apparatuses from various perspectives.

The present invention has been made to solve the above problems, and a main object thereof is to be able to centrally manage the operation types of a plurality of analysis apparatuses in order to manage the plurality of analysis apparatuses from various perspectives.

Solution to Problem

That is, an analysis apparatus management system according to the present invention includes: one or more analysis apparatuses; and a management apparatus that acquires various data from each of the one or more analysis apparatuses and centrally manages the acquired data, wherein each of the one or more analysis apparatuses includes an operation type data acquisition part that acquires data of each preset operation type, and an operation type data transmission part that transmits the operation type data acquired by the operation type data acquisition part, and the management apparatus includes an operation type data reception part that receives the operation type data, an operation type data storage part that stores the operation type data received by the operation type data reception part on a data type by data type basis, and a display control part that displays a list of the operation type data stored in the operation type data storage part for each of the one or more analysis apparatuses.

An analysis apparatus management system according to the present invention includes: one or more analysis apparatuses; and a management apparatus that acquires various data from each of the one or more analysis apparatuses and centrally manages the acquired data, wherein each of the one or more analysis apparatuses includes an operation type data acquisition part that acquires data of each preset operation type, and an operation type data transmission part that transmits the operation type data acquired by the operation type data acquisition part, and the management apparatus includes an operation type data reception part that receives the operation type data, and a display control part that displays a list of the operation type data received by the operation type data reception part for each of the one or more analysis apparatuses.

In such a case, each analysis apparatus acquires data of each set operation type in advance, and the management apparatus acquires the operation type data from each analysis apparatus and displays a list of operation type data for each analysis apparatus. Therefore, the operation types of the plurality of analysis apparatuses can be centrally managed. As a result, the plurality of analysis apparatuses can be managed from various perspectives. For example, centrally managing a huge amount of audit trail operation data by separating them according to their type makes it is possible to easily find or easily view the required data from the huge amount of data.

Here, the operation type indicates how the analysis apparatus is operated or the status of the analysis apparatus such as measurement (an action of performing measurement on a sample), error, maintenance, security (operations related to security such as login and user management), analysis (operations for determining the components, the configuration, and the like based on the measured results), operation (general operations such as opening a database and opening a project), and report operation. Examples of operation type data are the number of times of measurement, the number of times of error, the number of times of maintenance, the number of times of security, the number of times of analysis, the number of times of operation, or the number of times of report operation.

Although it is also contemplated that the display control part switches the list of operation type data to be displayed on the display on an analysis apparatus by analysis apparatus basis, in order to facilitate central management of a plurality of analysis apparatuses, it is preferable that the display control part displays a list of the operation type data of a plurality of analysis apparatuses.

Preferably, the management apparatus further includes an input reception part that receives a selection input for the plurality of analysis apparatuses displayed in a list, and the display control part displays audit trail data of the selected analysis apparatus.

The audit trail data is data obtained by recording history information such as the specific processing of the analysis apparatuses and the operations performed by the users in the original time order.

This configuration makes it possible to easily select the desired analysis apparatus from a plurality of analysis apparatuses, and easily search for the analysis apparatus whose audit trail data the user wishes to view.

Preferably, the operation type is set on an analysis apparatus by analysis apparatus basis, and the management apparatus recognizes the operation type data transmitted from each of a plurality of the analysis apparatuses and manages the operation type data on an analysis apparatus by analysis apparatus basis.

Since this configuration eliminates the need to define the operation types of the analysis apparatuses on the management apparatus side, the setting work upon connection of an analysis apparatus to be managed can be facilitated.

Preferably, the display control part displays the operational status of the one or more analysis apparatuses in a map format or graph format based on the operation type data.

Displaying the operational status in a map format or graph format means, for example, displaying a time series of the operational status of each analysis apparatus.

To make it easier for the user to recognize the status of each analysis apparatus, the display control part preferably displays the operational status of the one or more analysis apparatuses in a heat map format based on the operation type data.

To make it easier for the user to recognize the list of the operation type data of the one or more analysis apparatuses and the status thereof, the display control part preferably displays a list display region for displaying a list of the operation type data of the one or more analysis apparatuses and a graphical display region for displaying an operational status of the one or more analysis apparatuses in a map format or graph format based on the operation type data.

To eliminate the need for user management on the analysis apparatus side, preferably, each of the one or more analysis apparatuses further includes an authority data storage part that stores authority data defining authority for each function, and the management apparatus further includes an account data acquisition part that acquires account data of a user, and determines use authority of the user over the one or more analysis apparatuses based on the authority data stored in the authority data storage part from the account data acquired by the account data acquisition part.

A management method according to the present invention uses one or more analysis apparatuses and a management apparatus that acquires various data from each of the one or more analysis apparatuses and centrally manages the acquired data, the management method including: acquiring data of each preset operation type and transmitting the acquired operation type data to the management apparatus by the one or more analysis apparatuses; and receiving the operation type data, storing the operation type data on a data type by data type basis, and displaying a list of the operation type data for each of the one or more analysis apparatuses by the management apparatus.

A management program according to the present invention is used in an analysis apparatus management system including one or more analysis apparatuses and a management apparatus that acquires various data from each of the one or more analysis apparatuses and centrally manages the acquired data, wherein the management program provides the one or more analysis apparatuses with a function of an operation type data acquisition part that acquires data of each preset operation type, and an operation type data transmission part that transmits the operation type data acquired by the operation type data acquisition part, and provides the management apparatus with a function of an operation type data reception part that receives the operation type data, an operation type data storage part that stores the operation type data received by the operation type data reception part on a data type by data type basis, and a display control part that displays a list of the operation type data stored in the operation type data storage part for each of the one or more analysis apparatuses.

A management apparatus according to the present invention acquires various data from one or more analysis apparatuses and centrally manages the acquired data, the management apparatus including: an operation type data reception part that receives data of each preset operation type from the one or more analysis apparatus; an operation type data storage part that stores the operation type data received by the operation type data reception part on a data type by data type basis; and a display control part that displays a list of the operation type data stored in the operation type data storage part for each of the one or more analysis apparatuses.

Advantageous Effects of Invention

According to the present invention configured as described above, since the operation types of a plurality of analysis apparatuses can be centrally managed, the plurality of analysis apparatuses can be managed from various perspectives.

REFERENCE SIGNS LIST 100 analysis apparatus management system
10 analysis apparatus
12 operation type data acquisition part
13 operation type data transmission part
14 authority data storage part
20 management apparatus
21 operation type data reception part
22 operation type data storage part
23 display control part
E heat map
W2 list display region
W3 graphical display region
24 input reception part
25 account data acquisition part

Description of Embodiments

An analysis apparatus management system 100 according to an embodiment of the present invention will be described with reference to the drawings.

1. Apparatus Configuration of Analysis Apparatus Management System 100

Figure 1:
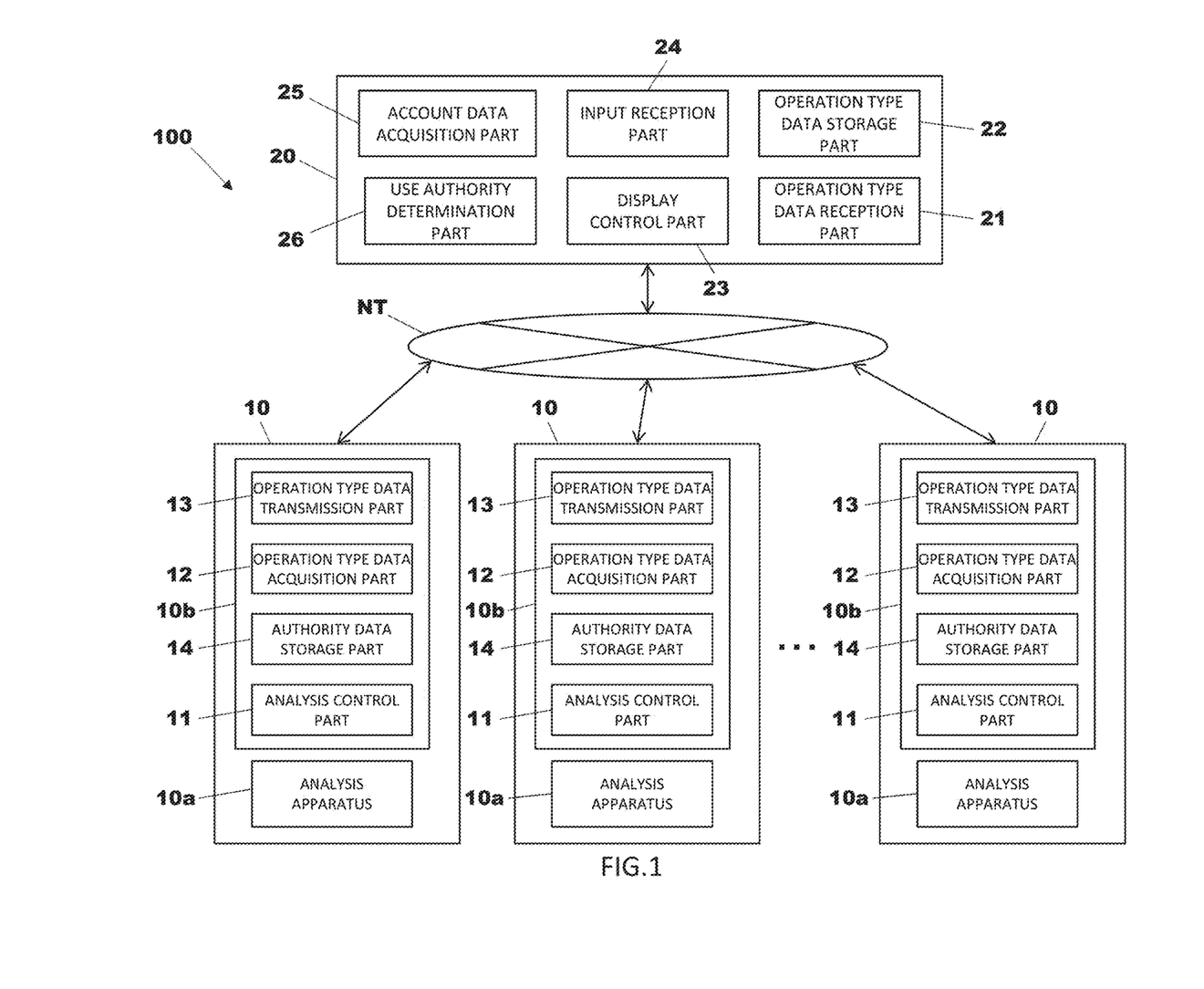
FIG. 1 is a schematic diagram illustrating an overall configuration of an analysis apparatus management system according to an embodiment of the present invention.

As illustrated in FIG. 1, the analysis apparatus management system 100 of the present embodiment includes one or more analysis apparatuses 10 and a management apparatus 20 communicably connected to the plurality of analysis apparatuses 10 via a wired or wireless network NT. The analysis apparatus management system 100 centrally manages the one or more analysis apparatuses 10 with the management apparatus 20.

Each analysis apparatus 10 has a measurement principle corresponding to the measurement item of the measurement sample. Each analysis apparatus 10 may be, for example, a spectroscopic analysis apparatus, an X-ray analysis apparatus, an elemental analysis apparatus, a particle size analysis apparatus, or a water quality analysis apparatus.

Each analysis apparatus 10 includes an analysis device 10a that analyzes a measurement sample and a control device 10b that controls components such as the analysis device 10a. The control device 10b is a computer including a CPU, a memory, an input/output interface, an A/D converter, a communication part, a display, and the like. The control device 10b functions as, in addition to an analysis control part 11, an operation type data acquisition part 12, an operation type data transmission part 13, and the like by cooperation between the CPU and peripheral devices based on analysis programs stored in the memory.

The operation type data acquisition part 12 acquires data of each preset operation type.

The operation types indicate how the analysis apparatus 10 is operated or the status of the analysis apparatus 10 such as measurement, error, maintenance, security, analysis, operation, and report operation.

Operation type data is, for example, the number of times the analysis apparatus has been operated or the number of times of the status of the analysis apparatus 10 such as the number of times of measurement, the number of times of error, the number of times of maintenance, the number of times of security, the number of times of analysis, the number of times of operation, or the number of times of report operation.

The operation type data transmission part 13 transmits the operation type data acquired by the operation type data acquisition part 12 to the management apparatus 20. The operation type data transmission part 13 transmits the operation type data acquired by the operation type data acquisition part 12 on an operation type by operation type basis.

The management apparatus 20 centrally manages the plurality of analysis apparatuses 10, and is a computer including a CPU, a memory, an input/output interface, an A/D converter, a communication part, a display, an input means, and the like. The management apparatus 20 functions as an operation type data reception part 21, an operation type data storage part 22, a display control part 23, an input reception part 24, and the like by cooperation between the CPU and peripheral devices based on management programs stored in the memory.

The operation type data reception part 21 receives the operation type data from the operation type data transmission part 12 of each analysis apparatus 10. The operation type data received by the operation type data reception part 21 is stored in the operation type data storage part 22.

Figure 2:
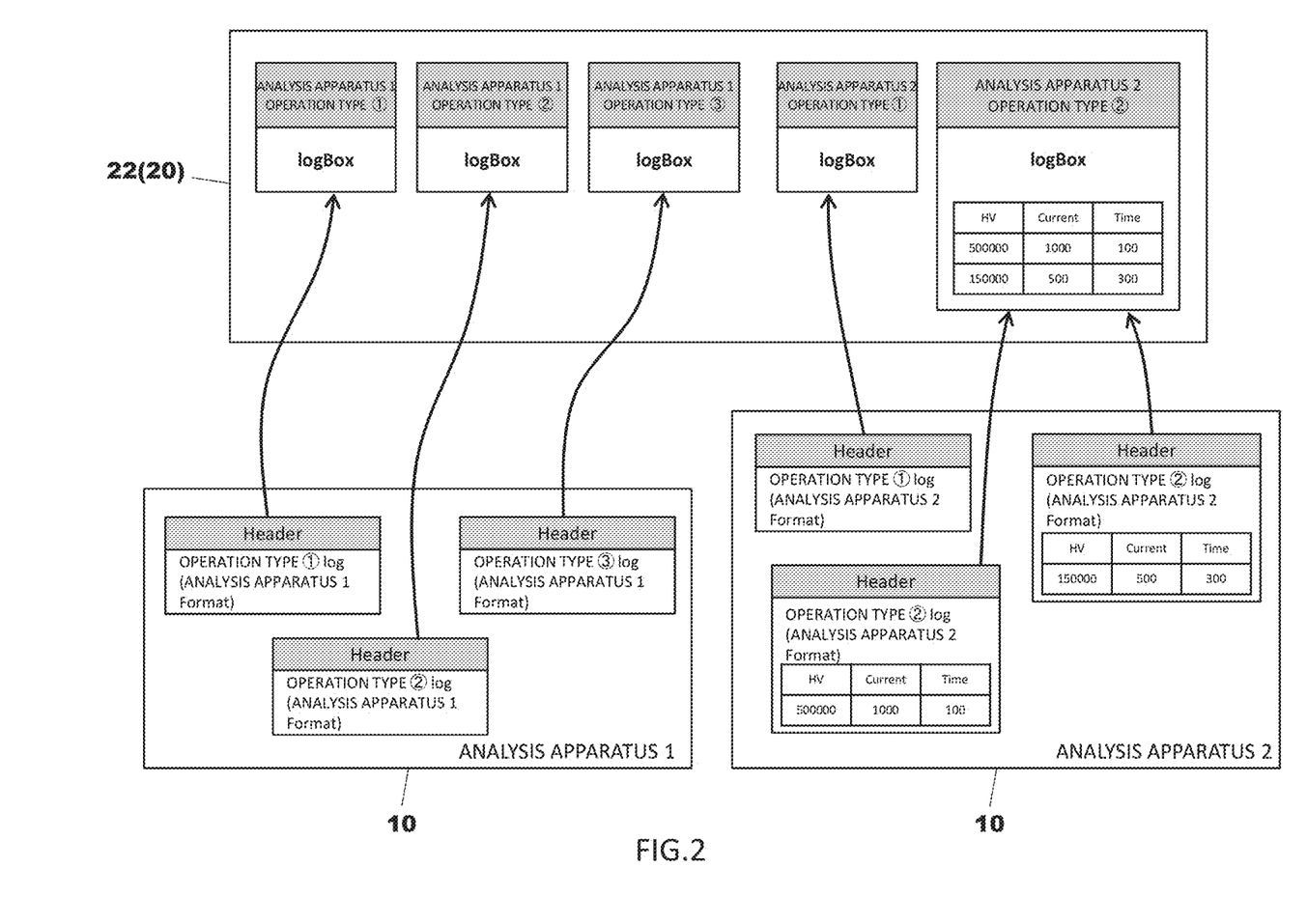
FIG. 2 is a schematic diagram illustrating collection of operation type data of the analysis apparatus management system according to the embodiment.

Specifically, as illustrated in FIG. 2, the operation type data reception part 21 recognizes the operation type data transmitted from each of the plurality of analysis apparatuses 10 and stores the operation type data in the operation type data storage part 22. The received pieces of operation type data are separated on an analysis apparatus 10 by analysis apparatus 10 basis and on a data type by data type (operation type by operation type) basis.

For example, a header (identifier) is attached to each operation type data, and the operation type data reception part 21 reads and recognizes the header to store the operation type data in a corresponding storage area (logBox). Further, when there is no storage area (logBox) for the read header (identifier), the operation type data reception part 21 creates a new storage area and stores the operation type data therein.

The display control part 23 displays a list of operation type data received by the operation type data reception part 21 for each analysis apparatus 10 on a display. Here, the display control part 23 displays a list of operation type data stored in the operation type data storage part 22 for each analysis apparatus 10 on a display.

Figure 3:
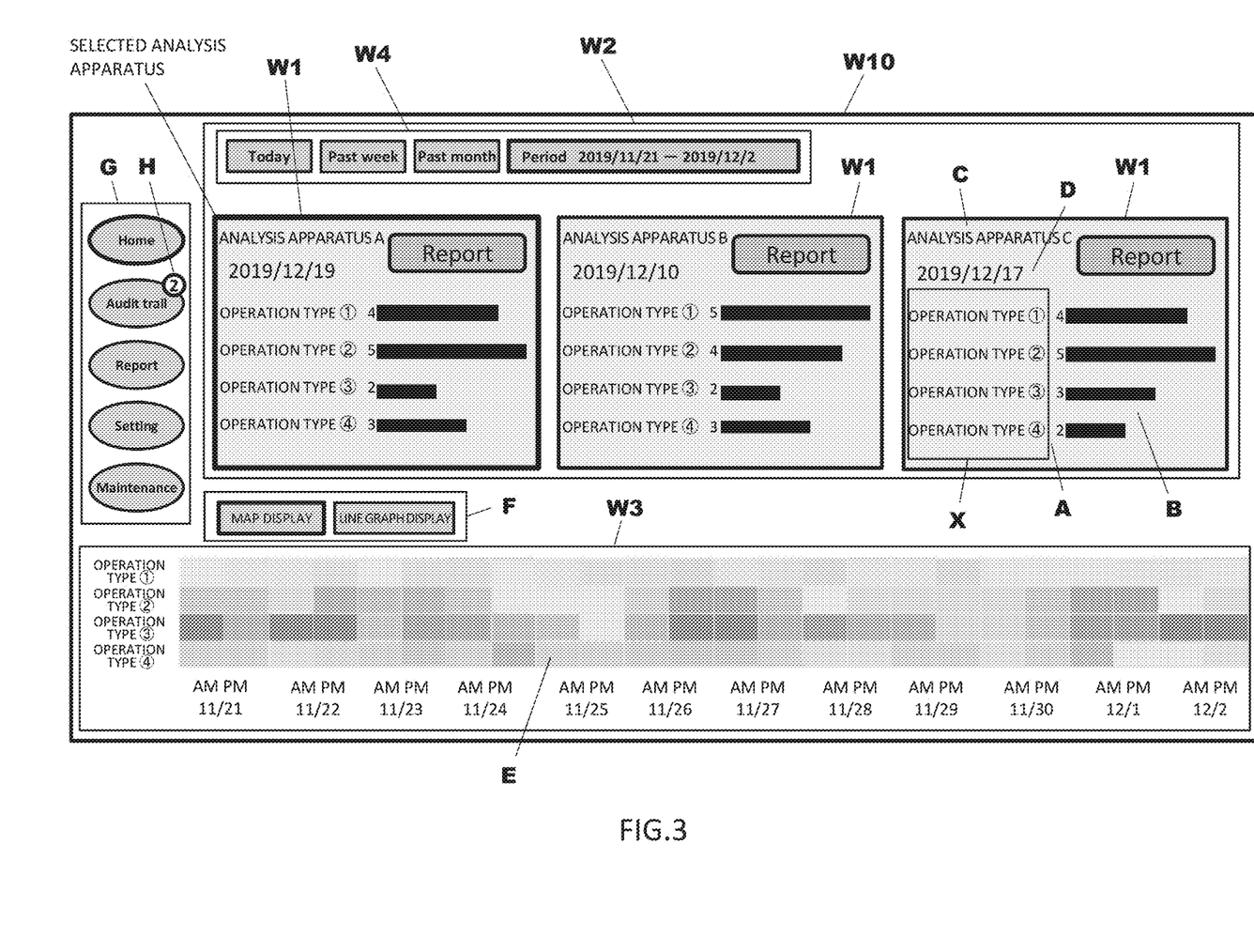
FIG. 3 is a diagram illustrating a display screen (dashboard screen) displayed by a display control part of the embodiment.

Specifically, as illustrated in FIG. 3, the display control part 23 displays a list of operation type data for each of a plurality of analysis apparatuses 10. A list of operation type data for each of the plurality of analysis apparatuses 10 is displayed in an individual region W1 set for each analysis apparatus 10. By displaying a list of the individual regions W1, the lists of operation type data corresponding to the plurality of analysis apparatuses 10 are displayed. The display control part 23 may also display a list of operation type data of the entire system.

The specific operation type data of the corresponding analysis apparatus 10 is displayed in each individual region W1. Specifically, a list of operation type X is displayed along with the number of times A, or count, of each operation type and a bar graph B showing the counts. Here, the bar graph B is color-coded for better visibility. In addition, the apparatus name C of the analysis apparatus 10 is displayed in the individual region W1, and the last update date D of the operation type data may also be displayed.

Based on the operation type data, the display control part 23 graphically displays the operational status of each analysis apparatus 10 in, for example, a map format or graph format in time series. Here, an example is shown in which the display control part 23 displays a heat map E showing the operational status of each analysis apparatus 10 in time series based on the operation type data. The display control part 23 displays a switching button F for switching the format in which the operational status of each analysis apparatus 10 is displayed between the map format and the line graph format.

In the present embodiment, the display control part 23 simultaneously displays lists of operation type data of the analysis apparatuses 10 and a graphical representation of the operational status of an analysis apparatus 10 on the same screen. Specifically, the display control part 23 simultaneously displays a list display region W2 for displaying lists of operation type data of the analysis apparatuses 10 and a graphical display region W3 for displaying the operational status of an analysis apparatus 10 in the map format or graph format on the same screen.

The display control part 23 also displays a period setting region W4 for switching the aggregation period (today, past one week, past one month, a specified period) of the operation type data. Based on the operation type data within the aggregation period set by the period setting region W4, the display control part 23 changes the display contents of the list display region W2 and the display contents of the graphical display region W3.

In addition to a dashboard screen W10 that displays the above-described lists, the display control part 23 displays one or more display switching buttons G for switching to and displaying one of an audit trail screen for displaying audit trail data of the analysis apparatuses 10, a report screen for displaying or approving report operation data of the analysis apparatuses 10, and a setting screen for configuring various settings for managing the analysis apparatuses 10. Specific examples of the display switching buttons G include a "Home" button for displaying the dashboard screen W10, an "Audit trail" button for displaying the audit trail screen, a "Report" button for displaying the report screen, and a "Setting" button for displaying the setting screen.

The input reception part 24 of the management apparatus 20 receives the input from the input means operated by the user. Examples of the input from the input means include a selection input for the plurality of analysis apparatuses 10 displayed in a list, a selection input of the aggregation period of operation type data, a selection input of the map format or graph format in the graphical display region W3, a switching input of the dashboard screen W10, the audit trail screen, or the like, and a report approval operation.

Then, the display control part 23 changes the display contents based on the input received by the input reception part 24.

For example, when the input reception part 24 receives a selection input of an analysis apparatus 10 on the dashboard screen W10, the operational status of the selected analysis apparatus 10 is displayed in the map format or graph format in the graphical display region W3. Here, if the audit trail data or the report operation data of the selected analysis apparatus 10 has been updated, a notification dot (batch) H indicating that the data has been updated (further, the number of times it has been updated) may be displayed on the display switching button G. Further, not only a notification dot but also whether there is an unprocessed report is displayed for each analysis apparatus 10. Specifically, a link to the report screen is attached to the display part (individual region W1) of each analysis apparatus 19 by the "Report" button, and the color of the "Report" button changes depending on the processed/unprocessed state (for example, processed→white, unprocessed→blue). In addition, the notification dot (batch) H may be displayed when a new report is sent in the entire system without being limited to the selected analysis apparatus.

When the input reception part 24 receives a selection input of an analysis apparatus 10 on the dashboard screen W10 and a switching input to the audit trail screen, the input reception part displays the audit trail data of the selected analysis apparatus 10 on the audit trail screen.

When the input reception part 24 receives a selection input of an analysis apparatus 10 on the dashboard screen W10 and a switching input to the report screen, the report operation data of the selected analysis apparatus 10 is displayed on the report screen.

Figure 4:
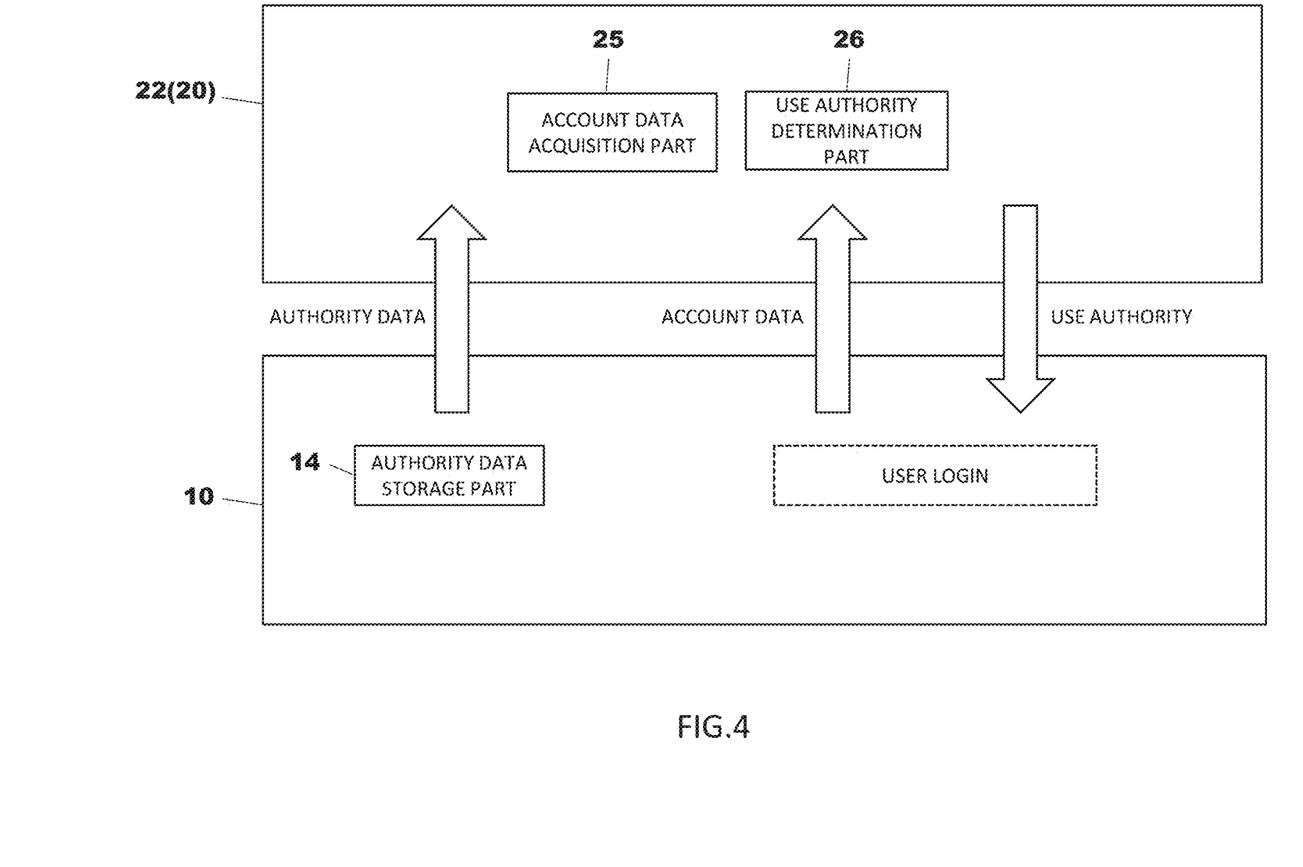
FIG. 4 is a schematic diagram illustrating a process of determining use authority according to the embodiment.

As illustrated in FIG. 4, the analysis apparatus management system 100 according to the present embodiment is configured to collectively perform a plurality of authority management operations on the management apparatus 20 side.

Figure 5:
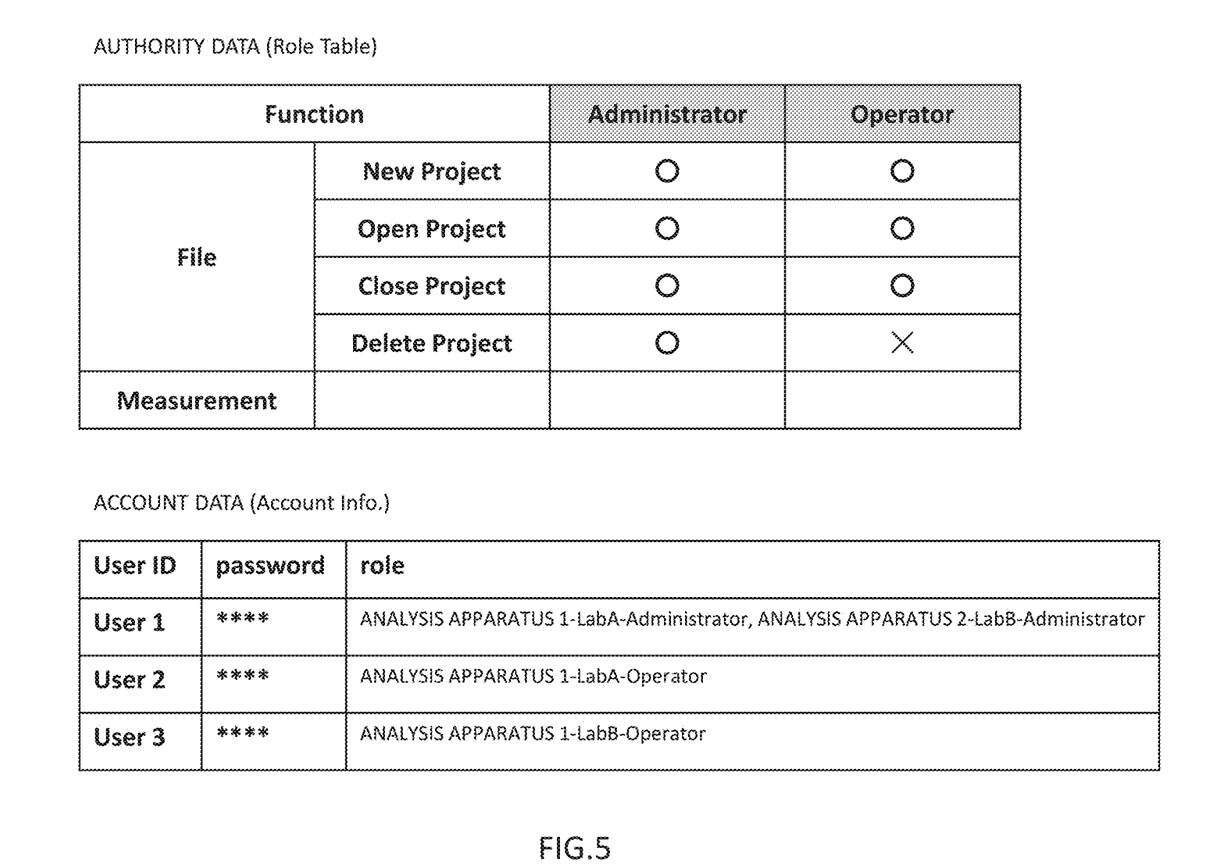
FIG. 5 is a schematic diagram illustrating authority data according to the embodiment.

The analysis apparatus 10 further includes an authority data storage part 14 that stores authority data defining the authority for each function (see FIG. 1). Here, as illustrated in FIG. 5, the authority data is set on an analysis apparatus 10 by analysis apparatus 10 basis, and indicates, for each function, the authority granted to one or more roles (such as administrator, operator, and the like).

In addition, the management apparatus 20 includes an account data acquisition part 25 that acquires account data of the user, and a use authority determination part 26 that determines the use authority of the user over the analysis apparatuses 10 (see FIG. 1).

The account data acquisition part 25 acquires, from each analysis apparatus 10, the account data of a user who has logged in to the analysis apparatus 10. Here, as illustrated in FIG. 5, the account data indicates a user ID, a password, and the role (such as administrator, operator, or the like) of the user for each apparatus 10.

The use authority determination part 26 determines the use authority of the user for each analysis apparatus 10 based on the account data acquired by the account data acquisition part 25 and the authority data stored in the authority data storage part 14. Then, the use authority determination part 26 transmits data indicating the determined use authority to each analysis apparatus 10. As a result, a user who has logged in can only perform operations that are based on the use authority given to that user for each analysis apparatus 10.

Figure 6:
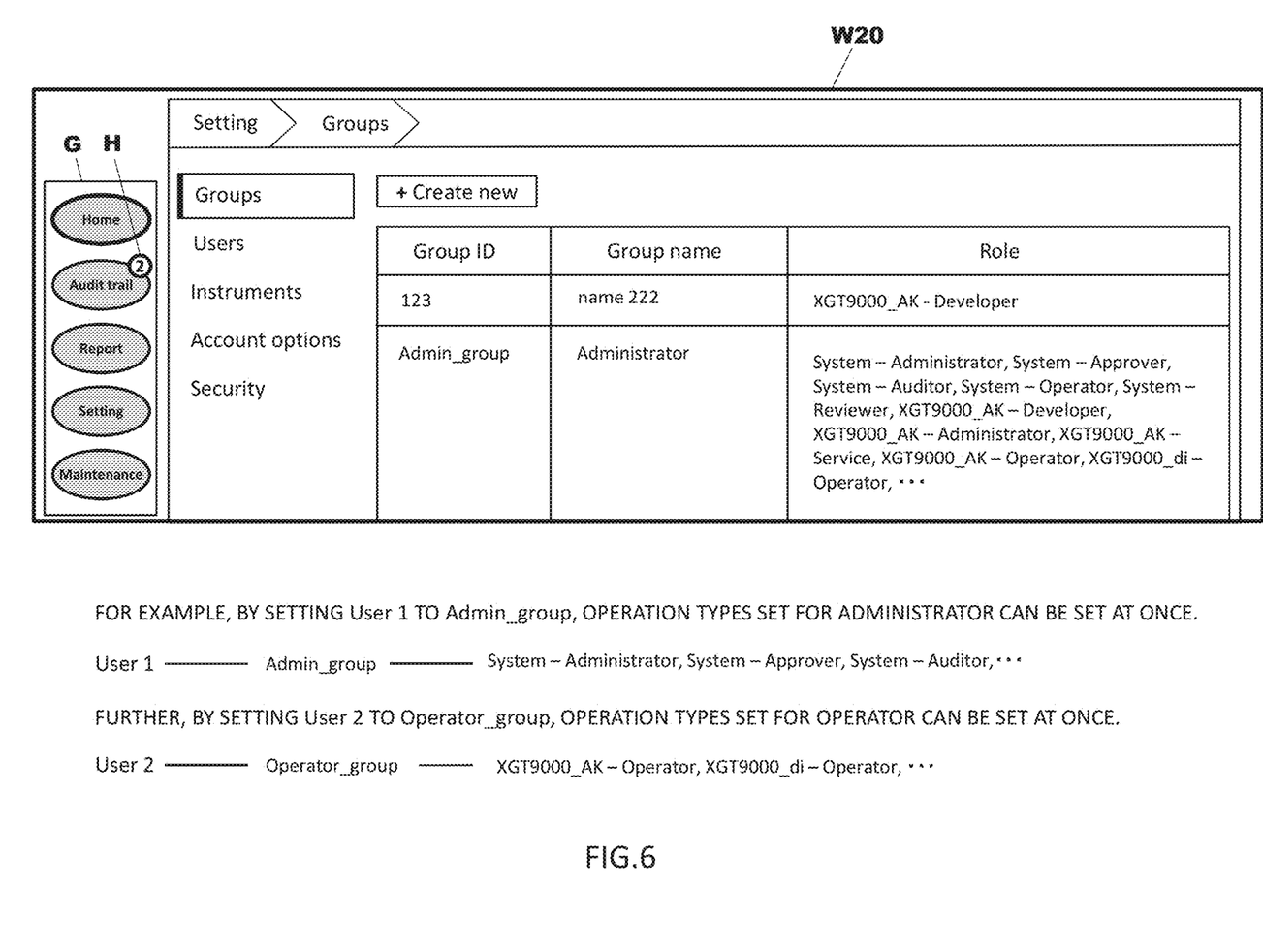
FIG. 6 is a diagram illustrating a display screen (setting screen) displayed by the display control part of the embodiment.

When the input reception part 24 receives a selection input of the "Setting" button of the display switching buttons G, a setting screen W20 for configuring various settings is displayed as illustrated in FIG. 6. On the setting screen W20, the analysis apparatuses 10 and operation types over which each user has authority are displayed, and they can be set and changed on this screen. It is also possible to set and change the role (such as administrator, operator, or the like) of each user on the setting screen W20. Further, it is possible to set and change the analysis apparatus 10 and the operation types over which each role has authority. By setting the analysis apparatuses 10 and the operation types over which each role has authority, and assigning a role to a user, the analysis apparatuses 10 and operation types over which the user has authority can be collectively assigned (a user management function). FIG. 6 illustrates an example in which a list of the analysis apparatuses and operation types over which the roles (Group ID) "123" and "Admin_group" have authority is displayed.

In addition, which user is permitted to manage or operate each analysis apparatus 10, the expiration date of the authority of the user, or the like is displayed on the setting screen W20, and can be set and changed thereon (an apparatus management function). Conditions such as how many characters the password of each user should have can be set on the setting screen W20.

2. Effects of Present Embodiment

According to an analysis apparatus management system 100 of the present embodiment configured as described above, each analysis apparatus 10 acquires data of each set operation type in advance, and the management apparatus 20 acquires the operation type data from each analysis apparatus 10 and displays a list of operation type data for each analysis apparatus 10. This enables central management of the operation types of the plurality of analysis apparatuses 10. As a result, the plurality of analysis apparatuses 10 can be managed from various perspectives.

Since the display control part 23 displays a list of operation type data of each of the plurality of analysis apparatuses 10 by the plurality of individual regions W1, the operation types of the plurality of analysis apparatuses 10 can be easily centrally managed. Since an analysis apparatus 10 can be selected from a list of the plurality of analysis apparatuses 10, and the display control part 23 displays the audit trail data of the selected analysis apparatus 10, it is possible to easily access the audit trail data of the desired analysis apparatus 10 of the plurality of analysis apparatuses 10.

Since the operation type data reception part 21 recognizes the operation type data transmitted from each of the plurality of analysis apparatuses 10 and stores the pieces of operation type data in the operation type data storage part 22 separately on an analysis apparatus 10 by analysis apparatus 10 basis, there is no need to define the operation types of the analysis apparatuses 10 on the management apparatus 20 side. This facilitates the setting work upon connection of an analysis apparatus 10 to be managed.

Since the display control part 23 displays the operational status of the analysis apparatus 10 in a map format or graph format based on the operation type data, the user can easily recognize the operational status of the analysis apparatus 10.

Since the display control part 23 displays the list display region W2 for displaying a list of the operation type data of the analysis apparatuses 10 and the graphical display region W3 for displaying the operational status of an analysis apparatus 10 in a map format or graph format based on the operation type data, the user can easily recognize the list of the operation type data of the analysis apparatuses 10 and the operational status of the analysis apparatus 19.

3. Modifications

The present invention is not limited to the above embodiment.

The analysis apparatus management system according to the above embodiment may be configured to attach an electronic signature to the report. This prevents data tampering.

Figure 7:
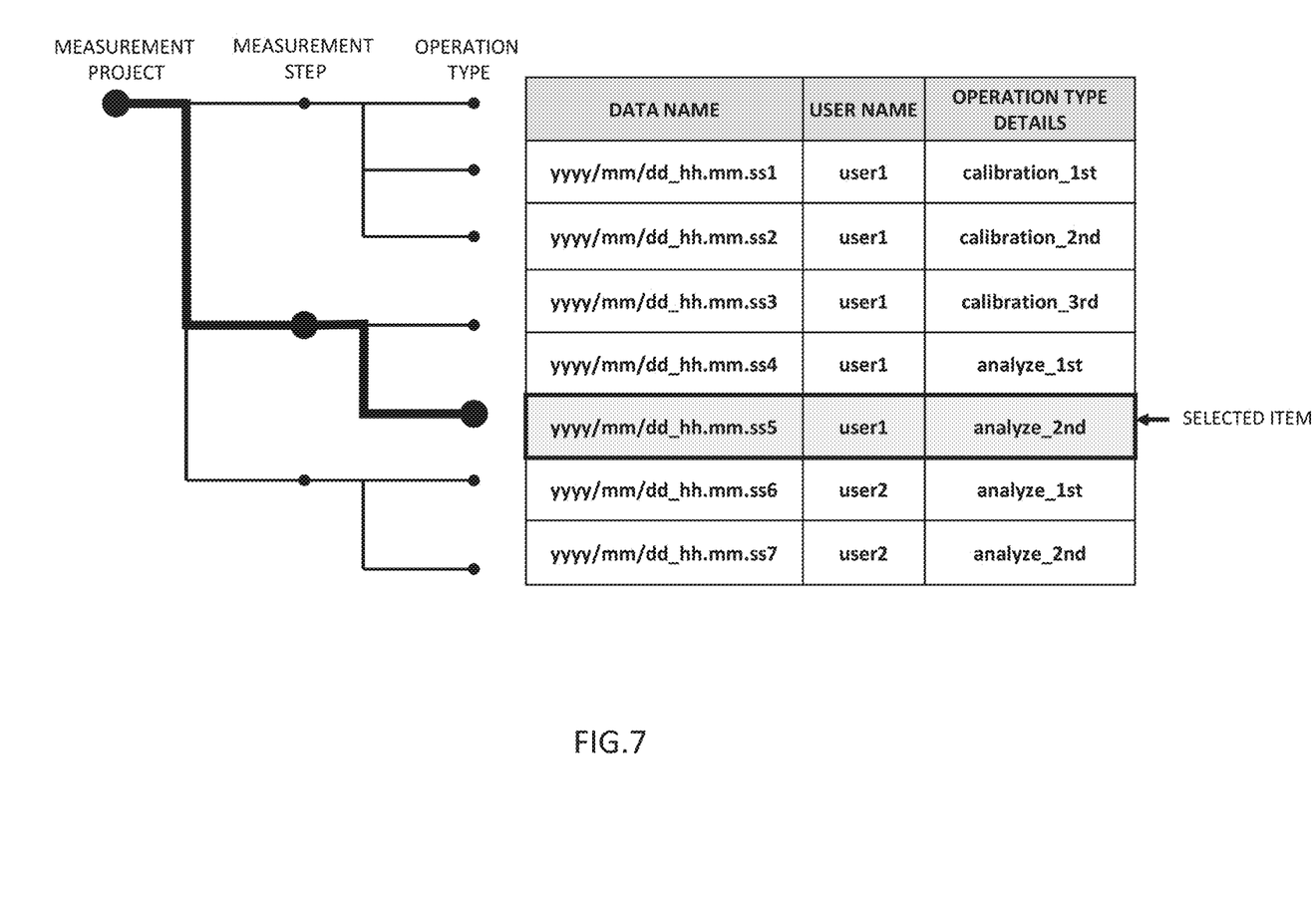
FIG. 7 is a diagram illustrating a display screen according to a modification.

As illustrated in FIG. 7, the display control part 23 may display a series of operation types in a tree structure (a tree structure constituted of a measurement project, measurement steps, and operation types) together with a list of operation type data items (for example, data name, user name, and operation type details). The measurement steps refer to a concept including a calibration step, an analysis step, an editing step, and the like.

One operation type data log can be selected from the list of operation type data logs, and the display control part 23 highlights the route in the tree corresponding to the selected item, for example, shows it by a bold line or changes the color.

Figure 8:
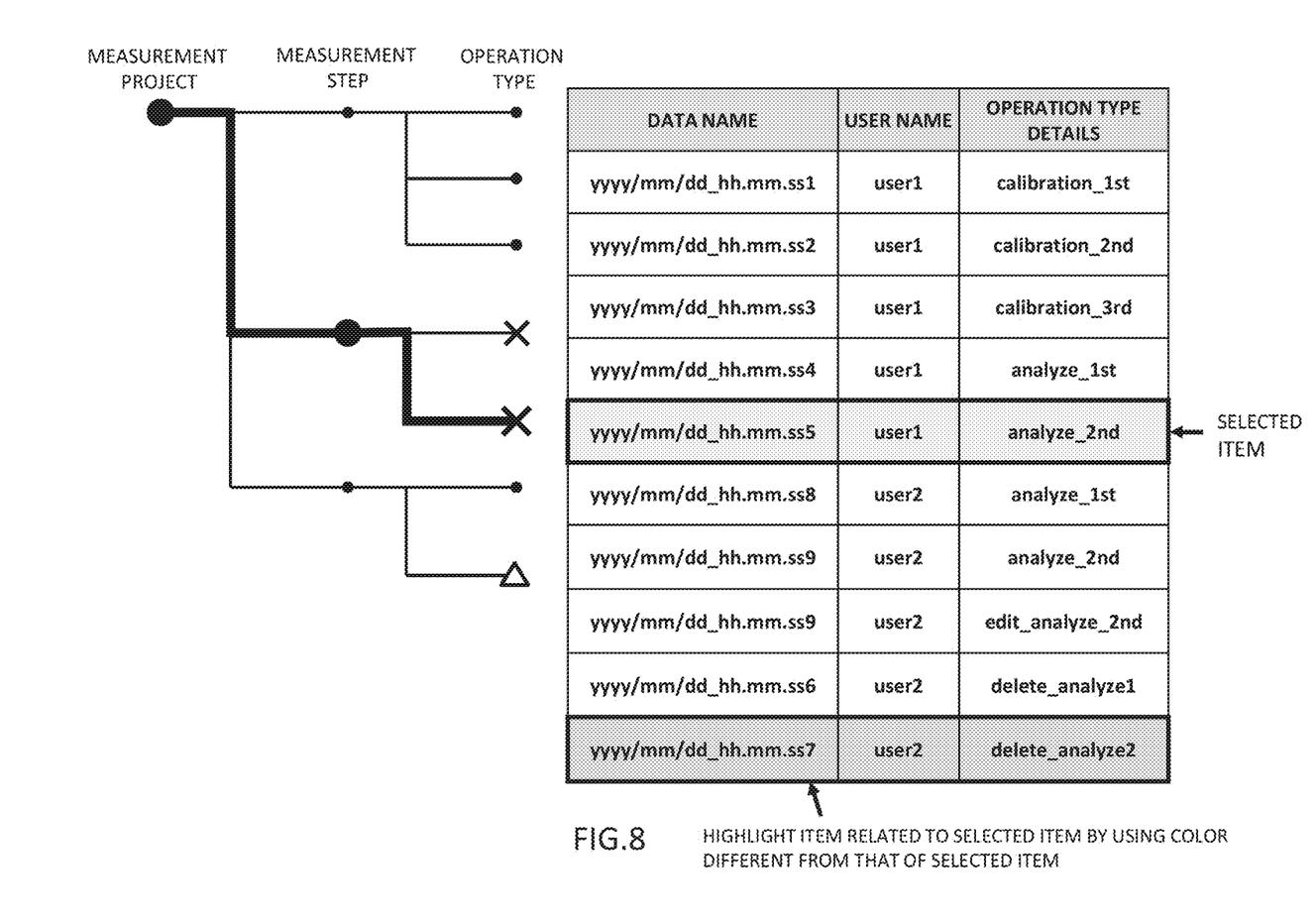
FIG. 8 is a diagram illustrating a display screen according to a modification.

When data is deleted or edited later afterwards, the deletion or editing operation is added to the list as an item ("delete_analyze2" in FIG. 8). How the route indicating the data before the deletion or editing ("analyze2_2nd" in FIG. 8) is represented also changes (for example, from a circle representation (○) to a cross representation (×)). Further, when an item corresponding to deleted or edited data is selected, an item related to the selected item is highlighted by representing it differently from the selected item (for example, the color is changed).

The display control part 23 may display only logs related to reports as a log table in the display mode illustrated in FIG. 7. In this case, the display control part 23 displays a tree of logs related to reports.

The management apparatus 20 may have a monitoring function of acquiring time-series data on voltage, temperature, the degree of wear, or the like from each analysis apparatus 10, displaying the time-series data, and issuing an alarm if necessary.

Figure 9:
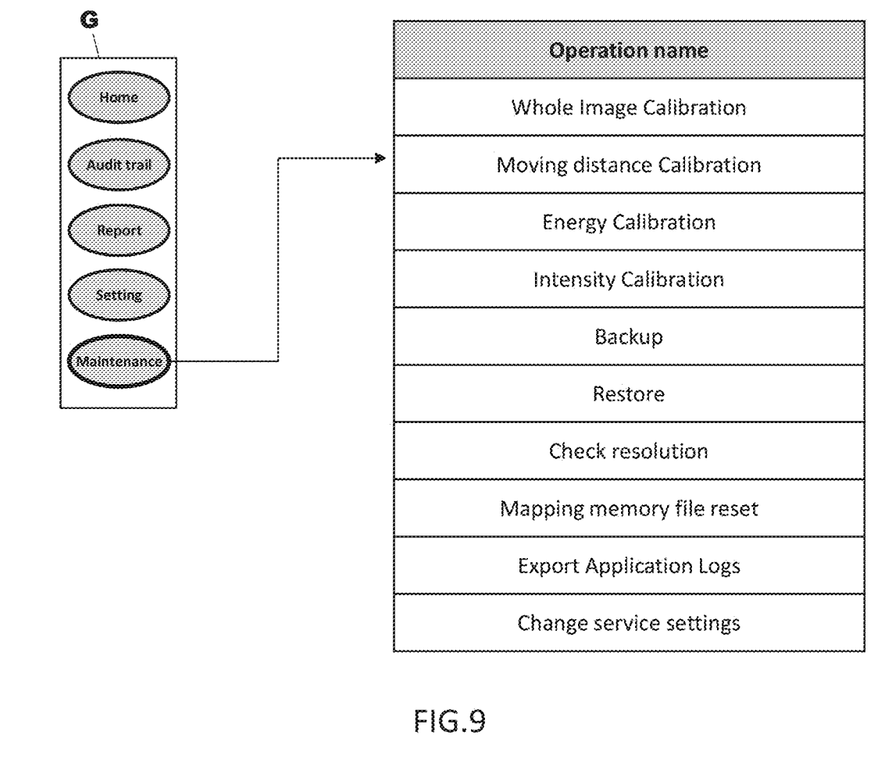
FIG. 9 is a diagram illustrating a display screen according to a modification.

In addition, as illustrated in FIG. 9, a button ("Maintenance" button) for displaying only the maintenance information may be displayed as a display switching button G. Although the "Maintenance" button is provided in FIGS. 3 and 6, the "Maintenance" button may not be included in the above embodiment. By selecting the "Maintenance" button, the display control part 23 displays a maintenance screen for displaying the maintenance information. The maintenance screen displays only a list of maintenance information over which the user has authority according to the user ID input when the user logged in. For example, the maintenance information for a service engineer is displayed as a list on the maintenance screen by the service engineer logging in and pressing the "Maintenance" button. When a user who is not a service engineer logs in, the maintenance information is not displayed. The maintenance information may record information on the work performed on the analysis apparatus, such as adjustment, so that a service engineer after takeover can also refer to the maintenance information including information on the work.

The management apparatus 20 may have a function of preventing executable files such as that of analysis software from being tampered. Specifically, an error detection code such as a checksum of an execution file of the analysis apparatus 10 is registered in the management apparatus 20. The analysis apparatus 10 calculates the error detection code, for example, the checksum every time it is activated, and transmits the calculation result to the management apparatus 20. When the error detection code, for example, the checksum initially registered is different from the error detection code transmitted from the analysis apparatus 10, the management apparatus 20 displays a warning in the audit trail. In addition, when an execution file such as that of analysis software is to be upgraded, the error detection code, for example, the checksum is updated.

It goes without saying that the present invention is not limited to the above embodiments, and various modifications can be made without departing from the spirit of the present invention.

INDUSTRIAL APPLICABILITY

According to the present invention, the operation types of a plurality of analysis apparatuses can be centrally managed.

The invention claimed is:
1. An analysis apparatus management system comprising:
a plurality of analysis apparatuses with different measurement principles, wherein the plurality of analysis apparatuses include two or more apparatus selected from the group consisting of a spectroscopic analysis apparatus, an X-ray analysis apparatus, an elemental analysis apparatus, a particle size analysis apparatus, and a water quality analysis apparatus; and
a management apparatus that acquires various data from each of the plurality of analysis apparatuses and centrally manages the acquired data,
wherein each of the plurality of analysis apparatuses includes a first hardware processor that
acquires data of each operation type, the operation type data to be acquired being set on an analysis apparatus by analysis apparatus basis, and
transmits the operation type data that has been acquired to the management apparatus, and wherein the management apparatus includes a display screen, an operation type data storage memory, and a second hardware processor that receives the operation type data from the each of the plurality of analysis apparatuses, stores the operation type data received by the each of the plurality of analysis apparatuses in the operation type data storage memory on a data type by data type basis, and displays on the display screen a list of the operation type data stored in the operation type data storage memory for the each of the plurality of analysis apparatuses.

2. An analysis apparatus management system comprising:

a plurality of analysis apparatuses with different measurement principles, wherein the plurality of analysis apparatuses include two or more apparatus selected from the group consisting of a spectroscopic analysis apparatus, an X-ray analysis apparatus, an elemental analysis apparatus, a particle size analysis apparatus, and a water quality analysis apparatus; and a management apparatus that acquires various data from each of the plurality of analysis apparatuses and centrally manages the acquired data, wherein each of the plurality of analysis apparatuses includes a first hardware processor that acquires data of each operation type on a data type by data type basis, the operation type data to be acquired being set on an analysis apparatus by analysis apparatus basis, and transmits the operation type data that has been acquired to the management apparatus, and the management apparatus includes a display screen and a second hardware processor that receives the operation type data from the each of the plurality of analysis apparatuses, and displays on a display screen a list of the operation type data received from the each of the plurality of analysis apparatuses for the each of the plurality of analysis apparatuses.

3. The analysis apparatus management system according to claim 1, wherein the second hardware processor displays a list of the operation type data of the each of the plurality of analysis apparatuses.

4. The analysis apparatus management system according to claim 3, wherein the second hardware processor of the management apparatus further receives a selection input for the plurality of analysis apparatuses displayed in a list, and displays audit trail data of the selected analysis apparatus.

5. The analysis apparatus management system according to claim 1, wherein the management apparatus recognizes the operation type data transmitted from each of a plurality of the analysis apparatuses and manages the operation type data on an analysis apparatus by analysis apparatus basis.

6. The analysis apparatus management system according to claim 1, wherein the second hardware processor displays an operational status of the each of the plurality of analysis apparatuses in a map format or graph format based on the operation type data.

7. The analysis apparatus management system according to claim 6, wherein the second hardware processor displays the operational status of the each of the plurality of analysis apparatuses in a heat map format based on the operation type data.

8. The analysis apparatus management system according to claim 1, wherein the second hardware processor displays a list display region for displaying a list of the operation type data of the each of the plurality of analysis apparatuses and a graphical display region for displaying an operational status of the each of the plurality of analysis apparatuses in a map format or graph format based on the operation type data.

9. The analysis apparatus management system according to claim 1, wherein the each of the plurality of analysis apparatuses further includes an authority data storage memory that stores authority data defining authority for each function, and the second hardware processor acquires account data of a user, and determines use authority of the user over the each of the plurality of analysis apparatuses based on the authority data stored in the authority data storage memory from the account data.

10. The analysis apparatus management system according to claim 1, wherein the operation type of the each of the plurality of analysis apparatuses respectively includes data selected from the group consisting of a number of times of operation, the number of times of measurement, the number of times of an error, the number of times of maintenance, the number of times of security, the number of times of analysis, the number of times of operation, and the number of times of report operation.

11. A management method using a plurality of analysis apparatuses with different measurement principles and a management apparatus that acquires various data from each of the plurality of analysis apparatuses and centrally manages the acquired data, wherein the plurality of analysis apparatuses include two or more apparatus selected from the group consisting of a spectroscopic analysis apparatus, an X-ray analysis apparatus, an elemental analysis apparatus, a particle size analysis apparatus, and a water quality analysis apparatus, the management method comprising:

acquiring, by a first hardware processor of the each of the plurality of analysis apparatuses, data of each operation type for the each of the plurality of analysis apparatuses, the data to be acquired being set on an analysis apparatus by analysis apparatus basis, and transmitting by the first hardware processor of the each of the plurality of analysis apparatuses the acquired operation type data to the management apparatus; and receiving the operation type data, storing the operation type data on a data type by data type basis, and displaying a list of the operation type data for each of the plurality of analysis apparatuses by a second hardware processor of the management apparatus.

12. A non-transitory computer readable storage medium having stored therein a management program used in an analysis apparatus management system including a plurality of analysis apparatuses with different measurement principles and a management apparatus that acquires various data from each of the plurality of analysis apparatuses and centrally manages the acquired data, the plurality of analysis apparatuses including two or more apparatus selected from the group consisting of a spectroscopic analysis apparatus, an X-ray analysis apparatus, an elemental analysis apparatus, a particle size analysis apparatus, and a water quality analysis apparatus, wherein the management program causes a respective first hardware processor of the each of the plurality of analysis apparatuses to acquire data of each operation type, the data to be acquired being set on an analysis apparatus by analysis apparatus basis, and transmit the operation type data that has been acquired to the management apparatus, and causes a second hardware processor of the management apparatus to receive the operation type data from the each of the plurality of analysis apparatuses, store the operation type data received from the each of the plurality of analysis apparatuses in an operation type storage memory on a data type by data type basis, and display on a display screen a list of the operation type data stored for the each of the plurality of analysis apparatuses.

13. A management apparatus that acquires various data from a plurality of analysis apparatuses with different measurement principles and centrally manages the acquired data, the plurality of analysis apparatuses including two or more apparatus selected from the group consisting of a spectroscopic analysis apparatus, an X-ray analysis apparatus, an elemental analysis apparatus, a particle size analysis apparatus, and a water quality analysis apparatus, the management apparatus comprising a display screen, an operation type data storage memory, and a hardware processor that:

receives data from each of the plurality of analysis apparatuses of each operation type, the data to be acquired being set on an analysis apparatus by analysis apparatus basis from the plurality of analysis apparatus;

stores the operation type data received from the plurality of analysis apparatuses in the operation type storage memory on a data type by data type basis; and displays on the display screen a list of the operation type data stored in the operation type storage memory for each of the plurality of analysis apparatuses.

* * * * *